United States Patent Office 3,636,170
Patented Jan. 18, 1972

3,636,170
PROCESS FOR PREPARING HALOGENATED
AROMATICS
Vincent A. Notaro, Monroeville, and Charles M. Selwitz, Pitcairn, Pa., assignors to Gulf Research & Development Company
No Drawing. Filed July 3, 1969, Ser. No. 839,042
Int. Cl. C07c 25/04
U.S. Cl. 260—650 R 10 Claims

ABSTRACT OF THE DISCLOSURE

A process for preparing a nuclear chloro or nuclear bromo aromatic compound which involves heating an aromatic compound in the presence of a nitrate ion, a nitrite ion, NO or $NO_2$, a chloride or bromide ion, water, oxygen and a strong acid.

---

A halogenated aromatic selected from the group consisting of chloro aromatics and bromo aromatics can be obtained by a process which comprises heating an aromatic compound selected from the group consisting of an aromatic hydrocarbon and a halogenated aromatic hydrocarbon with a compound selected from the group consisting of copper, manganese, cerium, cobalt, vanadium, chromium, iron, nickel, cadmium, tin, antimony, mercury, bismuth and the noble metals and compounds of these metals, a substance selected from the group consisting of nitrate ions, nitrite ions, NO and $NO_2$, a halogen ion selected from the group consisting of chloride ions and bromide ions and an inert organic solvent.

In the above procedure the defined metal or metal compound and organic solvent can be eliminated, provided water and molecular oxygen are present, and the desired chloro aromatic or bromo aromatic will still be obtained. In other words the process involves heating an aromatic compound selected from the group consisting of an aromatic hydrocarbon and a halogenated aromatic hydrocarbon with a substance selected from the group consisting of nitrate ions, nitrite ions, NO and $NO_2$, a halogen ion selected from the group consisting of chloride ions and bromide ions, water and molecular oxygen. In this manner a simple and economic system is obtained, since the presence of the organic solvent and the metal or metal compound tends to give rise to difficult and serious recovery and purification problems. This is disclosed in our copending application Ser. No. 730,646 filed May 20, 1968.

We have found, unexpectedly, that in the above procedure the presence of a strong acid increases the rate of conversion of the aromatic hydrocarbon and the halogenated aromatic hydrocarbon and, in the case wherein said aromatic hydrocarbons carry at least one alkyl substituent having at least one hydrogen on the carbon atom adjacent to the aromatic ring, there is reduced reaction of said alkyl with halogen, oxygen, etc. By "strong acid," we mean to include protonic acids having ionization constants at 25° C. greater than about $10^{-2}$. Such acids include perchloric acid, toluene sufonic acid, trifluoroacetic acid, sulfuric acid, iodic acid, etc. Acids that fall outside the above definition, for example, hydrofluoric acid, phosphoric acid, boric acid, mandelic acid, benzoic acid, etc., would not be suitable for use herein.

The aromatic hydrocarbon reactant employed herein can be an aromatic hydrocarbon or a halogenated (chloro, bromo, fluoro, or iodo) aromatic hydrocarbon. Examples of such aromatic hydrocarbons that can be employed herein include benzene, toluene, ethylbenzene, cumene, naphthalene, anthracene, biphenyl, phenanthrene, t-butylbenzene, α-phenylnaphthalene, para-xylene, polystyrene, terphenyl, 3-phenylheptane, 1,4-diphenyl butane, diphenylmethane, tetralin, propylium anion, etc. Examples of such halogenated aromatic hydrocarbons that can be employed herein include chlorobenzene, ortho-bromotoluene, meta-iodobiphenyl, para - fluorobiphenyl, 2,3 - dichloronaphthalene, ortho-chlorotoluene, meta - chlorotoluene, para-chlorotoluene, 1-phenyl-4-chloronaphthalene, 1 - (3-fluorophenyl)-4-ethylnaphthalene, 2-iodophenanthrene, 6-chloronaphthacene, 4,10-dichlorochrysene, 1,5,6,10-tetrabromopyrene, 1-fluoro-4-chloro-5-bromo-7-iodotriphenylene, tri(2-chlorophenyl)methane, fluorobenzene, bromobenzene, iodobenzene, orthodichlorobenzene, meta-dichlorobenzene, para-dichlorobenzene, etc.

Also present in the reaction system is a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion containing one nitrogen atom and three oxygen atoms. By "nitrite ions" we mean to include $No_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc.

Additionally there must be present in the reaction system chloride ions or bromide ions in sufficient quantities to halogenate the aromatic compound defined above. By "chloride ions or bromide ions" we mean a singly negatively charged chlorine or bromine atom. Desirably the chloride ions or bromide ion is obtained from any compound which is capable of dissociating in the reaction system to chloride or bromide ions, such as hydrogen chloride and hydrogen bromide. Also present in the reaction system is water, molecular oxygen and a strong acid.

The reaction defined herein is simply effected by bringing the materials together into contact with each other under specified conditions. The amount of chloride or bromide ion present in the reaction system relative to the aromatic hydrocarbon reactant, on a molar basis, can be from about 20:1 to about 1:20, preferably from about 6:1 to about 1:2. The amount of nitrate ion, nitrite ion, NO or $NO_2$ employed, on a molar basis, relative to the aromatic compound, can be from about 1:1 to about $1:10^6$, preferably from about 1:3 to about $1:10^6$. On a molar basis, relative to the aromatic compound, water can be present in the range of about 1000:1 to about 0.1:1, preferably about 10:1 to about 2:1. The amount of molecular oxygen that can be employed relative to the aromatic compound reactant, on a molar basis, can be from about 1000:1 to about 1:10, preferably from about 10:1 to about 1:1. The amount of strong acid employed relative to water, on a molar basis, can be from about 2:1 to about 1:20, preferably from about 1:2 to about 1:8. The temperature employed during the process can range from about 15° to about 200° C., preferably from about 60° to about 150° C., the presence from about 0.1 to about 10,000 pounds per square inch gauge, preferably from about ten to about 1000 pounds per square inch gauge, but most preferably from about 50 to about 150 pounds per square inch gauge, and the contact time from about 0.0001 to about 200, preferably from about one to about ten hours.

At the end of the reaction period, the desired chloro or bromo aromatic compound can be recovered from the reaction mixture in any suitable manner, for example, by phase separation and distillation at a temperature of about 50° to about 200° C. and a pressure of about 0.001 to about ten pounds per square inch gauge. Depending upon the boiling points of the products in the reaction mixture, the individual components thereof, including the desired chloro or bromo aromatic, will come off individually overhead and can thus be easily recovered.

The process of the invention can further be illustrated by the following.

A series of runs were made in which a mixture of reactants, as set forth below in Table I, was heated in an atmosphere of oxygen. Analysis by gas chromatography resulted in data reproduced below in Table I.

TABLE I

| Run No. | 1 | 2 | 3 | 4 | 5 |
|---|---|---|---|---|---|
| Reactants, millimols: | | | | | |
| HCl | 452 | 452 | 452 | 452 | 452 |
| HNO$_3$ | 50 | 50 | 50 | 50 | 50 |
| H$_2$O | 4,453 | 4,386 | 4,386 | 4,453 | 4,386 |
| Toluene | 450 | 450 | 450 | 450 | 450 |
| H$_2$SO$_4$ | 0 | 592 | 0 | 0 | 0 |
| H$_3$PO$_4$ | 0 | 0 | 403 | 0 | 0 |
| HClO$_4$ | 0 | 0 | 0 | 588 | 0 |
| p-Toluenesulfonic | 0 | 0 | 0 | 0 | 401 |
| Time, hours | 6.0 | 5.5 | 5.75 | 6.5 | 5.5 |
| T, °C | 80 | 80 | 80 | 80 | 80 |
| P, pounds per square inch gauge | 170 | 170 | 170 | 170 | 170 |
| Millimols oxygen used* | 55.20 | 200.40 | 68.16 | 218.88 | 139.92 |
| Products, weight percent in product: | | | | | |
| Toluene | 76.58 | 13.31 | 70.02 | 6.49 | 36.86 |
| Chlorotoluene | 25.99 | 86.24 | 32.12 | 93.35 | 67.20 |
| Benzaldehyde plus benzyl chloride | 1.16 | 2.17 | 1.84 | 1.00 | 0.45 |
| Benzyl alcohol | 0.22 | 0 | 0.18 | 0 | 0 |
| Unknown I | 0 | 0.09 | 0.12 | 0.08 | 0.08 |
| Chlorobenzaldehyde | 0.11 | 0.08 | 0 | 0 | 0 |
| Nuclear dichlorotoluenes | 0.77 | 2.16 | 0.76 | 2.13 | 0.56 |
| Alpha, ortho dichlorotoluene | 0.02 | 0.21 | 0.24 | 0.06 | 0 |
| Alpha, para dichlorotoluene | 0.18 | 0.42 | 0 | 0.23 | 0 |
| Trichlorotoluenes | 0.03 | 0.39 | 0 | 1.05 | 0.25 |
| Conversion, mol percent (to chlorotoluene) | 20.3 | 83.0 | 25.6 | 91.8 | 55.0 |
| Side chain attack, percent | 5.4 | 2.8 | 6.6 | 1.3 | 1.1 |

*Determined by pressure drop in system.

The improvement obtained by operation in accordance with the procedures defined herein can be seen from an inspection of the data in Table I. Note that in Run No. 1, wherein no strong acid was present, the conversion to chlorotoluene was 20.3 percent and the side chain attack amounted to 5.4 percent. In Run No. 2 the presence of sulfuric acid in the reaction system increased the conversion to 83.0 percent and the side chain attack was reduced to 2.8 percent. Phosphoric acid in Run No. 3, on the other hand, gave but a slight improvement in conversion and aided side chain attack. Perchloric acid in Run No. 4 gave the best results obtained in the runs reported in Table I. In Run No. 5 p-toluenesulfonic acid resulted in a substantial increase in conversion and was extremely successful in inhibiting side chain attack. By "side chain attack," we mean the molar amount of reaction occurring at the alkyl group divided by the sum of the molar amount of reaction occurring at the alkyl group plus the molar amount of reaction occurring at the aromatic nucleus times one hundred.

Another series of runs were made in which a mixture of reactants, as set forth below in Table II, was heated in an atmosphere of oxygen. Analysis by gas chromatography resulted in data reproduced in Table II.

TABLE II

| Run No. | 1 | 2 | 3 |
|---|---|---|---|
| Reactants, millimols: | | | |
| HCl | 300 | 300 | 300 |
| HNO$_3$ | 50 | 50 | 58 |
| H$_2$SO$_4$ | 582 | 435 | 339 |
| H$_2$O | 3,919 | 3,911 | 4,546 |
| Orthochlorotoluene | 150 | 150 | 175 |
| Time, hours | 6.0 | 6.25 | 6.25 |
| T, °C | 80 | 80 | 80 |
| P, pounds per square inch guage | 170 | 170 | 170 |
| Millimols Oxygen used* | 87.12 | 61.20 | 42.48 |
| Products: | | | |
| Orthochlorotoluene | 20.25 | 50.36 | 101.19 |
| Dichlorotoluenes | 95.81 | 80.80 | 65.53 |
| Alpha, orthodichlorotoluenes | 5.67 | 5.96 | 3.60 |
| Trichlorotoluenes | 24.17 | 10.84 | 3.78 |
| Unknown materials | 1.43 | 0.68 | 0.66 |
| Ratio of H$_2$SO$_4$/H$_2$O | 1/6.7 | 1/9.0 | 1/13.4 |
| Conversion mol percent based on orthochloro toluene | 86.50 | 66.43 | 42.18 |
| Side chain attack, percent | 3.7 | 5.5 | 4.7 |

*Determined by pressure drop in system.

The data in Table II above illustrated two facets of the invention herein. First, it illustrates that the claimed process can be used to halogenate a halogenated aromatic, and, second, the effect the amount of sulfuric acid has on the conversion and on the side chain.

Obviously, many modifications and variations of the invention, as hereinabove set forth, can be made without departing from the spirit and scope thereof, and therefore only such limitations should be imposed as are indicated in the appended claims.

We claim:

1. In a process for preparing a nuclear halogenated aromatic hydrocarbon selected from the group consisting of nuclear chloro aromatic and nuclear bromo aromatic hydrocarbons which comprises heating aromatic compound selected from the group consisting of an aromatic hydrocarbon and a halogenated aromatic hydrocarbon with (1) a substance selected from the group consisting of nitrate ions, nitrite ions, NO and NO$_2$, (2) a halogen ion selected from the group consisting of chloride ions and bromide ions, (3) water, and (4) molecular oxygen, wherein the temperature employed is from about 15° to about 200° C., the pressure from about 0.1 to about 10,000 pounds per square inch gauge and the contact time about 0.0001 to about 200 hours, with the amount of chloride or bromide ion present relative to the aromatic hydrocarbon reactant, on a molar basis, being from about 20:1 to about 1:20, the amount of nitrate ion, nitrite ion, NO or NO$_2$, on a molar basis, relative to the aromatic compound being from about 1:3 to about 1:10$^6$, the amount of water, on a molar basis, relative to the aromatic compound being in the range of about 1000:1 to about 0.1:1, and the amount of molecular oxygen relative to the aromatic compound, on a molar basis, being about 1000:1 to about 1:10, the improvement which comprises additionally having present in the reaction mixture a protonic acid having ionization constant at 25° C. greater than about 10$^{-2}$ selected from the group consisting of perchloric acid, toluene sulfonic acid, trifluoroacetic acid, sulfuric acid and iodic acid, wherein the amount of said protonic acid employed, relative to water on a molar basis, is from about 2:1 to about 1:20.

2. The process of claim 1 wherein the amount of said protonic acid employed, relative to water on a molar basis, is from about 1:2 to about 1:8.

3. The process of claim 1 wherein said aromatic compound is an aromatic hydrocarbon.

4. The process of claim 1 wherein said aromatic compound is toluene.

5. The process of claim 1 wherein said aromatic compound is orthochlorotoluene.

6. The process of claim 1 wherein said chloride ions are obtained from HCl.

7. The process of claim 1 wherein said nitrate ions are obtained from HNO$_3$.

8. The process of claim 1 wherein said strong acid is sulfuric acid.

9. The process of claim 1 wherein said strong acid is perchloric acid.

10. The process of claim 1 wherein said strong acid is paratoluenesulfonic acid.

References Cited

UNITED STATES PATENTS

| | | | |
|---|---|---|---|
| 2,152,357 | 3/1939 | Moyer | 260—650 |
| 2,174,574 | 10/1939 | Fogler | 260—650 |
| 3,160,653 | 12/1964 | Benning et al. | 260—650 |
| 3,214,481 | 10/1965 | Heinemann et al. | 260—650 |
| 3,214,482 | 10/1965 | Capropreso et al. | 260—650 X |
| 3,509,204 | 4/1970 | Selwitz | 260—650 X |

HOWARD T. MARS, Primary Examiner

U.S. Cl. X.R.

260—649 R, 649 DP, 649 F, 650 F

PO-1050
(5/69)

UNITED STATES PATENT OFFICE
CERTIFICATE OF CORRECTION

Patent No. 3,636,170              Dated  January 18, 1972

Inventor(s)  Vincent A. Notaro and Charles M. Selwitz

It is certified that error appears in the above-identified patent and that said Letters Patent are hereby corrected as shown below:

Column 1, line 60, "sufonic" should be "sulfonic".

Column 4, line 34, after "heating" please insert "an".

Column 4, line 55, after "having" please insert "an".

Signed and sealed this 6th day of June 1972.

(SEAL)
Attest:

EDWARD M. FLETCHER, JR.                ROBERT GOTTSCHALK
Attesting Officer                       Commissioner of Patents